J. SHARPE.
GENERAL PROTRACTOR.
APPLICATION FILED JULY 19, 1912.
1,058,474.
Patented Apr. 8, 1913.
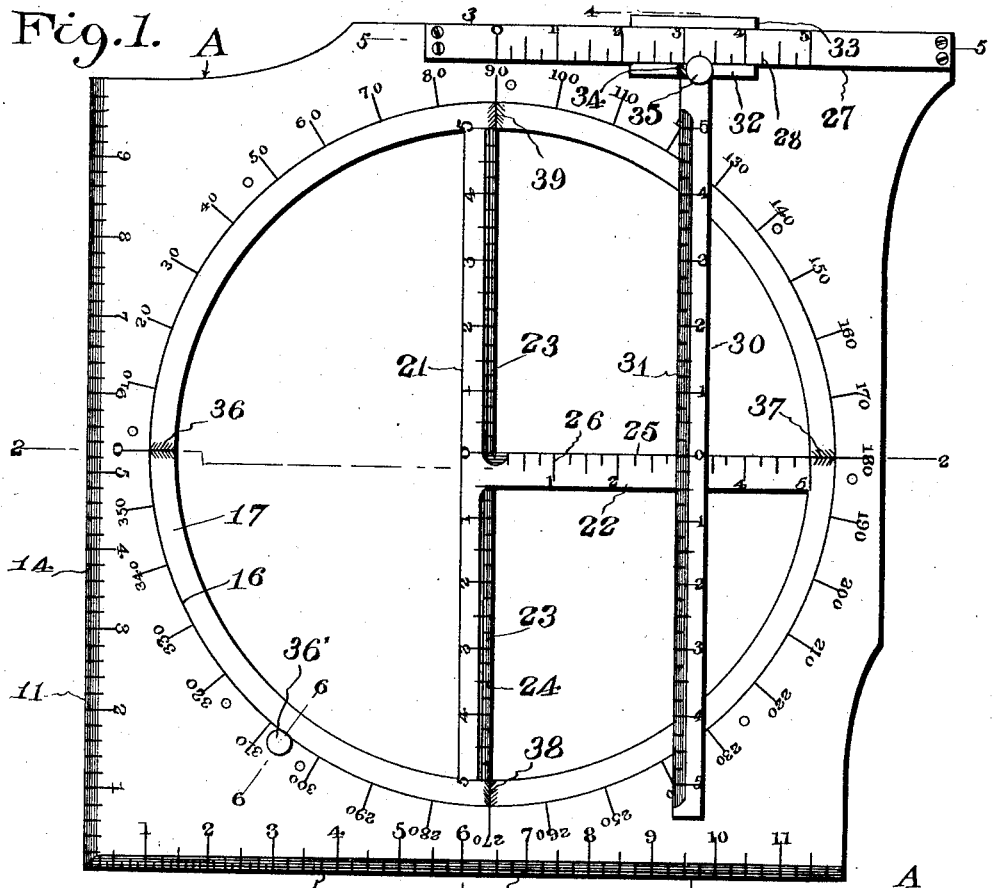
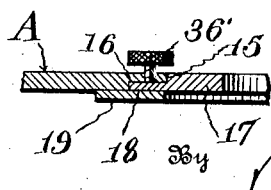
Witnesses:-
J. P. Wahler
Henry T. Bright
Inventor,
J. Sharpe.
By
Attorneys

UNITED STATES PATENT OFFICE.

JOSEPH SHARPE, OF FORT HUACHUCA, ARIZONA.

GENERAL PROTRACTOR.

1,058,474.  Specification of Letters Patent.  Patented Apr. 8, 1913.

Application filed July 19, 1912.  Serial No. 710,527.

*To all whom it may concern:*

Be it known that I, JOSEPH SHARPE, a citizen of the United States, residing at Fort Huachuca, in the county of Cochise, State of Arizona, have invented certain new and useful Improvements in General Protractors; and I do hereby declare the following to be a full, clear, and exact description of the invention, such as will enable others skilled in the art to which it appertains to make and use the same.

This invention relates to protractors.

The object of the invention resides in the provision of a protractor through the instrumentality of which various problems in civil and mechanical engineering may be solved without resorting to complicated mathematical calculation.

A further object of the invention resides in the provision of a protractor which will have a wide field of usefulness and which will be simple in construction, easy of use and which may be manufactured at a comparatively small cost.

With the above objects in view, the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of the protractor, Fig. 2, a section on the line 2—2 of Fig. 1, Fig. 3, a section on the line 3—3 of Fig. 1, Fig. 4, a section on the line 4—4 of Fig. 1, Fig. 5, a section on the line 5—5 of Fig. 1, and Fig. 6, a section on the line 6—6 of Fig. 1.

Referring to the drawings the instrument is shown as comprising a base or body A having adjacent sides 10 and 11 thereof disposed at right angles to each other and provided with graduations 13 and 14 respectively, said graduations being similar in nature and reading from the point of intersection of the sides 10 and 11 outwardly. The body A is provided with a circular opening 15 the wall of which is recessed throughout its entire length as at 16. Disposed within the opening 15 of the body A is a ring 17 the outer edge of which is provided with a flange 18 which seats in the recess 16. The ring 17 is held against disengagement from the base A by means of a securing ring 19 suitably attached to the bottom of the base A and overlapping the flange 18 of the ring 17. By this construction it will be apparent that not only is the ring 17 secured against disengagement from the base A but is also free to rotate axially. The face of the base A surrounding the opening 15 is provided with graduations representing the degrees of a circle having its center coincident with the axis of the ring 17. The inner edge of the ring 17 is connected at opposite points by a diametrical cross bar 21 and the center of this cross bar is connected to the inner edge of the ring 17 by a radial cross bar 22 disposed at right angles to the cross bar 21. It will be here noted with respect to the diametrical cross bar 21 that the side thereof adjacent the radial cross bar 22 is beveled as at 23 and provided with graduations 24 reading from the center of said bar outwardly. It will be further noted that the side of the diametrical cross bar 21 adjacent the radial cross bar 22 coincides with the diameter of the ring 17. Likewise the side edge 25 of the radial cross bar 22 coincides with a radius of the ring 17 and is provided with graduations 26 reading from the inner end of said radial cross bar outward. Mounted upon the base A along the side thereof opposite the side 10 and parallel to said latter side is a plate 27 provided with graduations 28, said graduations beginning at a point in line with the side edge of the bar 24 which coincides with a diameter of the ring 17. The plate 27 is supported in spaced relation to the base A by means of blocks 29 disposed between the terminals of said plate and the base A. Slidable between the plate 27 and base A is one end of an elongated plate 30 which is disposed parallel to the side 11 of the base and has the side thereof adjacent said side 11 beveled and provided with graduations 31. These graduations 31 read from a point in the plane of the graduated side edge of the radial bar 26 outwardly toward each end of the plate 30. The plate 30 just inward of the plate 27 is provided with a rib 32 which bears against the inner edge of the plate 27, while the extreme outer end of the plate 30 is provided with a cross arm 33 which bears against the outer side of the plate 27 and the adjacent side of the base A. The graduated side edge of the plate 31 is extended across the rib 32 by means of a line 34 whereby said graduated side edge of the plate 30 may be brought into registration with any of the graduations upon the plate 27 with certainty. Mounted in the rib 32 is a clamping screw 35 which is adapted to bear upon the adjacent face of the base A and thereby secure the plate 30 in any desired adjustment with respect to the plate 27. Mounted in the body A is another adjusting screw 36 which is adapted to bear upon the flange 18 and thereby secure the ring 17 against rotation on its axis. The ring 17 is provided on its upper face at opposite points with transverse lines 36 and 37 which register with the graduated side edge of the radial cross arm 26. Said ring 17 is also provided on its upper face at opposite points with lines 38 and 39 which register with the graduated side edge of the diametrical cross bar 24.

What is claimed is:

1. A protractor comprising a base, a ring rotatably mounted in said base the latter being provided with graduations surrounding said ring, a diametrical cross bar connecting the opposite sides of the inner edge of the ring and having one side edge graduated and disposed coincident with a given diameter of the ring, a radial cross arm disposed at right angles to the diametrical cross arm and connecting the latter with the inner edge of the ring, said radial cross arm having one side edge graduated and disposed coincident with a given radius of the ring, a graduated plate mounted on the upper face of the base in spaced relation to the latter, a graduated arm having one end slidably mounted between the plate and the base, and means for locking said arm against sliding movement.

2. A protractor comprising a base, a ring rotatably mounted in said base, the latter being provided with graduations surrounding said ring, means for locking said ring against rotation, a diametrical cross bar connecting the opposite sides of the inner edge of the ring and having one side edge graduated and disposed coincident with a given diameter of the ring, a radial cross arm disposed at right angles to the diametrical cross arm and connecting the latter with the inner edge of the ring, said radial cross arm having one side edge graduated and disposed coincident with a given radius of the ring, a graduated plate mounted on the upper face of the base in spaced relation to the latter, a graduated arm having one end slidably mounted between the plate and the base, and means for locking said arm against sliding movement.

3. A protractor comprising a base having a pair of adjacent side edges disposed at right angles to each other and provided with graduations, reading from their point of intersection outwardly, a ring rotatably mounted in said base, the latter being provided with graduations surrounding the ring, a diametrical cross bar connecting the opposite sides of the inner edge of the ring and having one side edge graduated and disposed coincident with a given diameter of the ring, and a radial cross arm disposed at right angles to the diametrical cross arm and connecting the latter with the inner edge of the ring, said radial cross arm having one side edge graduated and disposed coincident with a given radius of the ring.

In testimony whereof, I affix my signature, in presence of two witnesses.

JOSEPH SHARPE.

Witnesses:
JOHN H. CHAPPLE,
EUGENE A. LA FLAME.

---

Copies of this patent may be obtained for five cents each, by addressing the "Commissioner of Patents, Washington, D. C."